(54) METHOD FOR SETTING UP AND CONTROLLING CONFINEMENT MEDIA FLOW IN LASER SHOCK PEENING

(75) Inventors: Wayne L. Lawrence, Sardinia; Richard E. Klaassen, West Chester, both of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/385,399

(22) Filed: Aug. 30, 1999

(51) Int. Cl.$^7$ .......................... B23K 26/00; B23K 26/14; B23K 26/16
(52) U.S. Cl. ............................. 219/121.84; 219/121.73; 219/121.85
(58) Field of Search .................. 219/121.84, 121.73, 219/121.85

(56) References Cited

U.S. PATENT DOCUMENTS

| | | |
|---|---|---|
| 4,750,117 | 6/1988 | Gregory . |
| 4,937,421 | 6/1990 | Ortiz, Jr. et al. ............... 219/121.68 |
| 5,463,905 | 11/1995 | Baird . |
| 5,744,781 | 4/1998 | Yeaton . |
| 5,756,965 | 5/1998 | Mannava ......................... 219/121.85 |
| 6,057,003 | * 5/2000 | Dulaney et al. ..................... 427/457 |

FOREIGN PATENT DOCUMENTS

19801013A1   7/1999   (DE) .

* cited by examiner

*Primary Examiner*—M. Alexandra Elve
(74) *Attorney, Agent, or Firm*—Andrew C. Hess; V. Ramaswamy

(57) ABSTRACT

A method for setting up a transparent confinement media nozzle for flowing the confinement media during laser shock peening of a work piece includes the following steps: Step A) flowing a confinement media and setting a flow rate of the confinement media through a confinement media flow nozzle; Step B) positioning the nozzle to flow the confinement media through the nozzle and onto the correlation surface; and Step C) measuring a confinement media layer thickness on the correlation surface using an ultrasonic transducer attached to a side of the test piece opposite that of the correlation surface. The ultrasonic transducer is attached to a side of the test piece opposite that of the correlation surface. One embodiment of the invention employs the work piece as the test piece and the correlation surface is a first laser shock peening surface on a first side of the work piece. Further embodiments includes Step D) comparing the measured and recorded confinement media layer thickness from Step C) against a predetermined value or range of values for confinement media layer thickness and Step E) determining whether to reset the confinement media flow rate and/or nozzle position or proceeding with the laser shock peening of the work piece with the confinement media flow rate and nozzle position set in

26 Claims, 8 Drawing Sheets

METHOD FOR SETTING UP AND CONTROLLING CONFINEMENT MEDIA FLOW IN LASER SHOCK PEENING

BACKGROUND OF THE INVENTION

1. Field of the Invention

This invention relates to laser shock peening (LSP) and, more particularly, to a method for setting up and controlling the flow of water or other confinement media over the laser shocked area of the work piece during a laser shock peening process.

2. Description of Related Art

Laser shock peening or laser shock processing, as it is also referred to, is a process for producing a region of deep compressive residual stresses imparted by laser shock peening a surface area of a work piece. Laser shock peening typically uses one or more radiation pulses from high power pulsed lasers to produce an intense shock wave at the surface of a work piece similar to methods disclosed in U.S. Pat. No. 3,850,698 entitled "Altering Material Properties"; U.S. Pat. No. 4,401,477 entitled "Laser Shock Processing"; and U.S. Pat. No. 5,131,957 entitled "Material Properties". Laser shock peening, as understood in the art and as used herein, means utilizing a pulsed laser beam from a laser beam source to produce a strong localized compressive force on a portion of a surface by producing an explosive force at the impingement point of the laser beam by the instantaneous ablation or vaporization of a thin layer of that surface or of a coating (such as tape or paint) on that surface.

Laser shock peening is being developed for many applications in the gas turbine engine field, some of which are disclosed in the following U.S. Pat. No. 5,756,965 entitled "On The Fly Laser Shock Peening"; U.S. Pat. No. 5,591,009 entitled "Laser shock peened gas turbine engine fan blade edges"; U.S. Pat. No. 5,569,018 entitled "Technique to prevent or divert cracks"; U.S. Pat. No. 5,531,570 entitled "Distortion control for laser shock peened gas turbine engine compressor blade edges"; U.S. Pat. No. 5,492,447 entitled "Laser shock peened rotor components for turbomachinery"; U.S. Pat. No. 5,674,329 entitled "Adhesive tape covered laser shock peening"; and U. S. Pat. No. 5,674,328 entitled "Dry tape covered laser shock peening", all of which are assigned to the present Assignee.

Laser peening has been utilized to create a compressively stressed protective layer at the outer surface of a work piece, which is known to considerably increase the resistance of the work piece to fatigue failure as disclosed in U.S. Pat. No. 4,937,421 entitled "Laser Peening System and Method". These methods typically employ a curtain of water flowed over the work piece or some other method to provide a plasma confining medium. This medium enables the plasma to rapidly achieve shockwave pressures that produce the plastic deformation and associated residual stress patterns that constitute the LSP effect. The curtain of water provides a confining medium, to confine and redirect the process generated shock waves into the bulk of the material of a component being LSP'd, to create the beneficial compressive residual stresses. This confining medium also serves as a carrier to remove process generated debris and any unused laser beam energy. Water is an ideal confining medium since it is transparent to the ND:YAG beam wavelength and is easy to implement in production. The water curtain should be kept in continuous contact with the surface of the work piece or part being LSP'd and at a minimum predetermined thickness or in a range of thicknesses. The water curtain often must be kept at a depth of about 0.02 inches.

The current state of the art is to constantly monitor the confinement media via video monitor. This requires full attention of the operator and provides no thickness measurement data.

SUMMARY OF THE INVENTION

A method for setting up a transparent confinement media nozzle for flowing the confinement media during laser shock peening of a work piece includes the following steps for at least one point on a correlation surface of a test piece related to one patch of work piece to be laser shock peened: Step A) flowing a confinement media and setting a flow rate of the confinement media through a confinement media flow nozzle; Step B) positioning the nozzle to flow the confinement media through the nozzle and onto the correlation surface; and Step C) measuring a confinement media layer thickness on the correlation surface using an ultrasonic transducer attached to a side of the test piece opposite that of the correlation surface. The ultrasonic transducer is attached to a side of the test piece opposite that of the correlation surface. One embodiment of the invention employs the work piece as the test piece and the correlation surface is a first laser shock peening surface on a first side of the work piece. A preferred embodiment of the invention further includes Step D) comparing the measured and recorded confinement media layer thickness from Step C) against a predetermined value or range of values for confinement media layer thickness, and Step E) determining whether to reset the confinement media flow rate and/or nozzle position or proceeding with the laser shock peening of the work piece with the confinement media flow rate and nozzle position set in Step A) based on the comparison in Step D). If called for then Step F) resetting at least one of the confinement media flow rate and nozzle position and repeating Steps C), D), and E) is used.

One embodiment of the invention calls for performing Steps B) and C) for a plurality of points on the patch of the work piece to be laser shock peened and in Step D) comparing the measured and recorded confinement media layer thickness for each of the points from Step C) against the predetermined value or range of values for confinement media layer thickness. Then performing Step E) to determine whether to reset the confinement media flow rate and/or nozzle position or proceed with the laser shock peening of the work piece with the confinement media flow rate and nozzle position set in Step A) based on the comparison in Step D). Then, if called for, performing a Step F) resetting the confinement media flow rate and/or nozzle position and repeating Steps C), D), and E).

The method is preferably performed in a laser shock peening system having at least one fixed laser beam source for laser shock peening and a controllable first manipulator holding the work piece. Between Steps A) and B) a work piece attitude and/or a work piece position is adjusted by the first manipulator to match the work piece attitude and the work piece position during laser shock peening of the work piece. The setting and resetting of the nozzle position is done using a controllable second manipulator holding the nozzle.

For dual sided laser shock peening, the Steps A) through E) are a first set of steps and the method further includes performing a second set of the Steps A) through E) on a second laser shock peening surface of the work piece on a second side of the work piece opposite the first laser shock peening surface of the first side after Steps A) through E) are performed on the first laser shock peening surface. One particular embodiment provides for performing the method on a gas turbine engine component having an airfoil such as a turbine, compressor, or fan blade with leading edge and a trailing edge. The sides are convex suction and concave pressure sides of the airfoil and the patch is located along one of the edges. In one embodiment of the invention, an epoxy acoustic coupling material is placed between the ultrasonic transducer and the airfoil.

In yet another embodiment of the invention, the method is used to calculate a schedule of nozzle attitude and nozzle position settings for each of the points to provide a predetermined confinement media thickness over each of the points and then laser shock peening the work piece by firing a laser beam pulse from a laser shock peening apparatus on each of the points while flowing the confinement media over the points. The nozzle attitude and the nozzle position are set according to the schedule for each of the points during the laser shock peening prior to each firing for which the schedule calls for a change in the nozzle attitude and/or the nozzle position.

Advantages of the present invention are numerous and include lowering the cost, time, man power and complexity of performing set up of the confinement media or water curtain nozzle and performing quality assurance tests of the confinement media or water curtain nozzle during laser shock peening processes. Another advantage of the present invention is that it provides an in-process quality control that allows performing quality assurance tests of the water curtain thickness during laser shock peening processes on the actual production parts and at the site of the process and in real time with respect to the processing. The present invention can help greatly reduce the amount of down-time for performing quality assurance tests during laser shock peening.

The present invention provides a more accurate process for set up and control of confinement media. The added accuracy helps to reduce or eliminate rework for parts that may result in low high cycle fatigue (HCF) testing results because of low or insufficient confinement media thickness during laser shock peening. The present invention also provides a monitor of data between flow rate and nozzle position and attitude allowing correlation to confinement layer thickness measured by ultrasonic test of media on part. This in turn allows monitoring of flow rate data during laser shock peening during the firing of the laser beams to provide in-situ real time quality assurance monitoring of the laser shock peening process.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
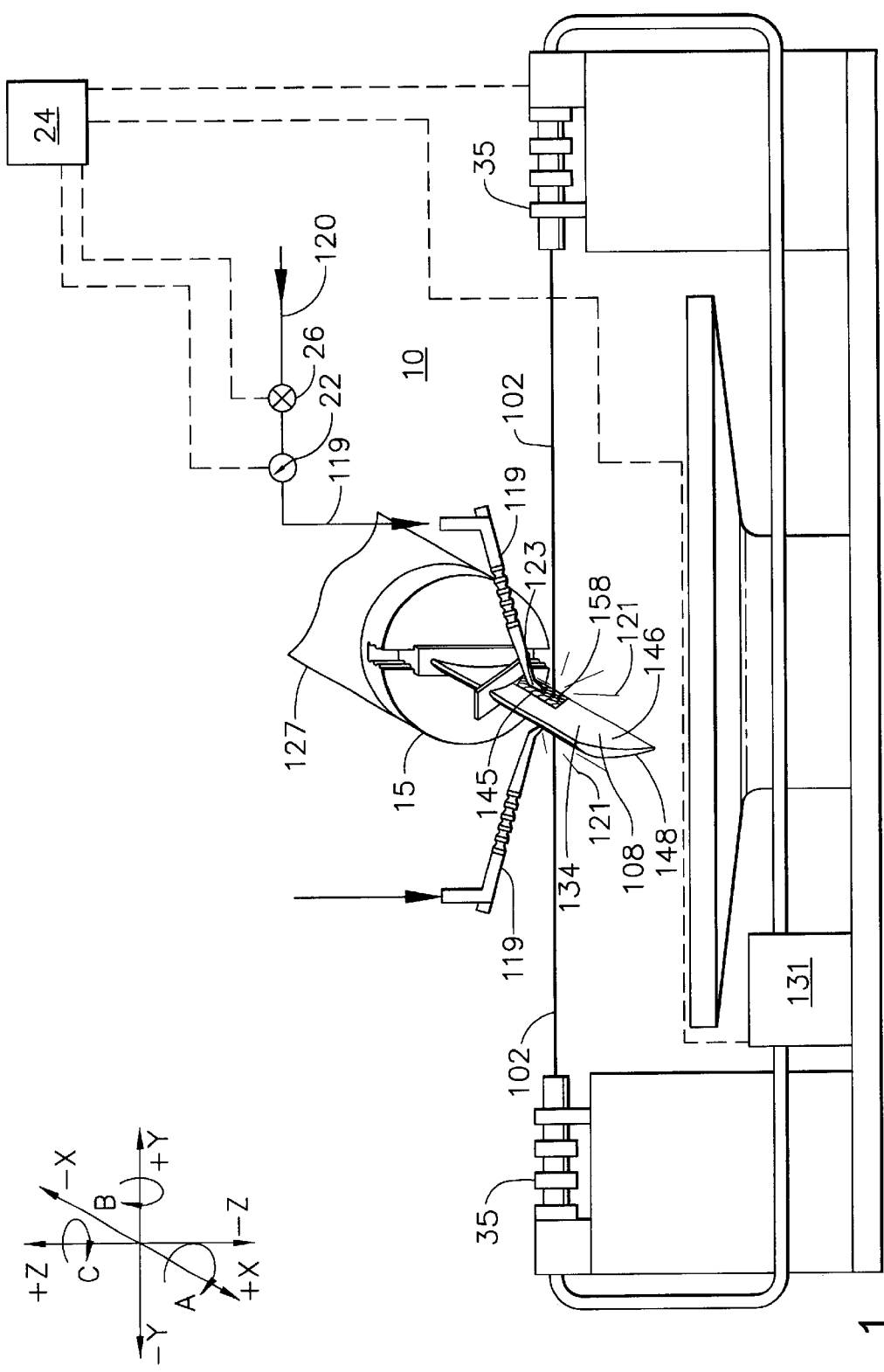
FIG. 1 is a schematic illustration of a blade mounted in a laser shock peening system in accordance with an exemplary embodiment of the present invention.

Illustrated in FIG. 1 is a schematic illustration of laser shock peening system 10 that is used to laser shock peen production and test work pieces exemplified by the blade 108 having an airfoil 134 with a patch 145 that is to be laser shock peened. The blade 108 is mounted in a fixture 15 which is attached to a five-axis computer numerically controlled (CNC) first manipulator 127, one of which is commercially available from the Huffman Corporation, having an office at 1050 Huffman Way, Clover, S.C. 29710. The five axes of motion that are illustrated in the exemplary embodiment are conventional translational axes X, Y, and Z, and conventional first, second, and third rotational axes A, B, and C respectively that are well known in CNC machining. The first manipulator 127 is used to continuously move and position the blade to provide laser shock peening "on the fly" in accordance with one embodiment of the present invention. Laser shock peening may be done in a number of various ways using paint or tape as an ablative medium (see in particular U.S. Pat. No. 5,674,329 entitled "Adhesive Tape Covered Laser Shock Peening").

Figure 3:
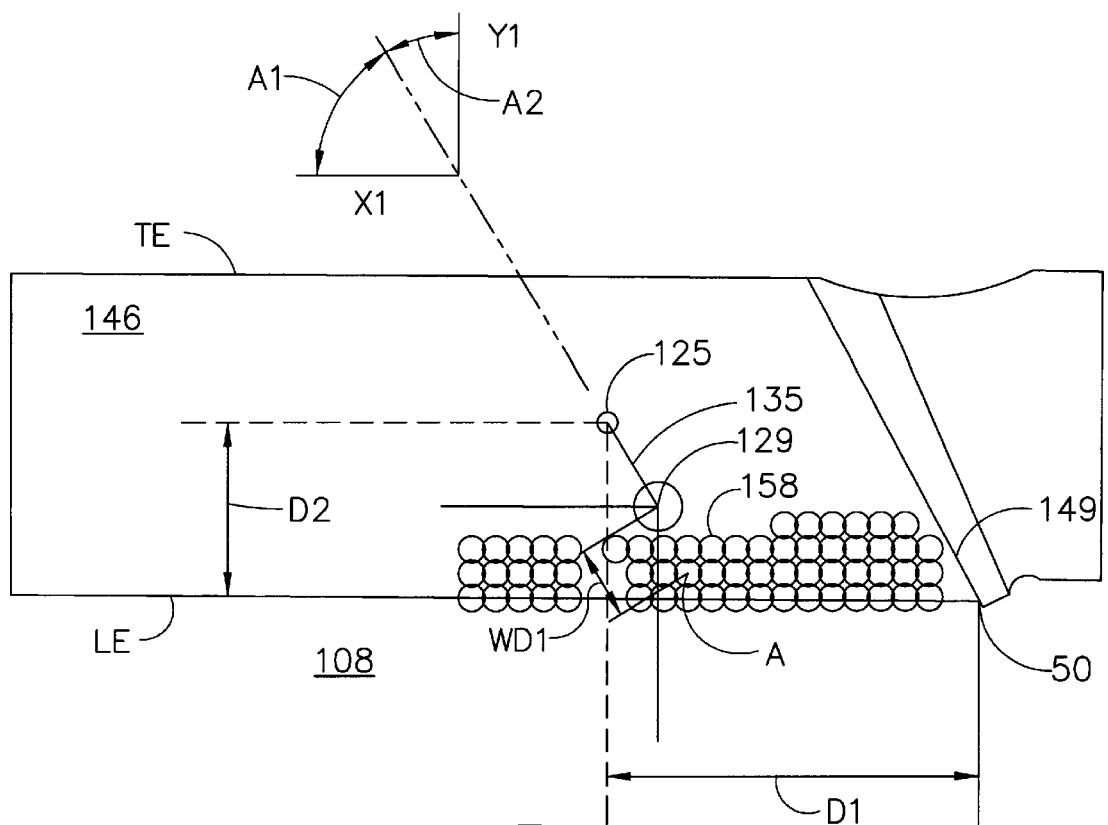
FIG. 3 is a plan form side view layout illustrating a nozzle location adjusted to flow water onto a patch on the concave side of the blade in FIG. 2.
Figure 7:
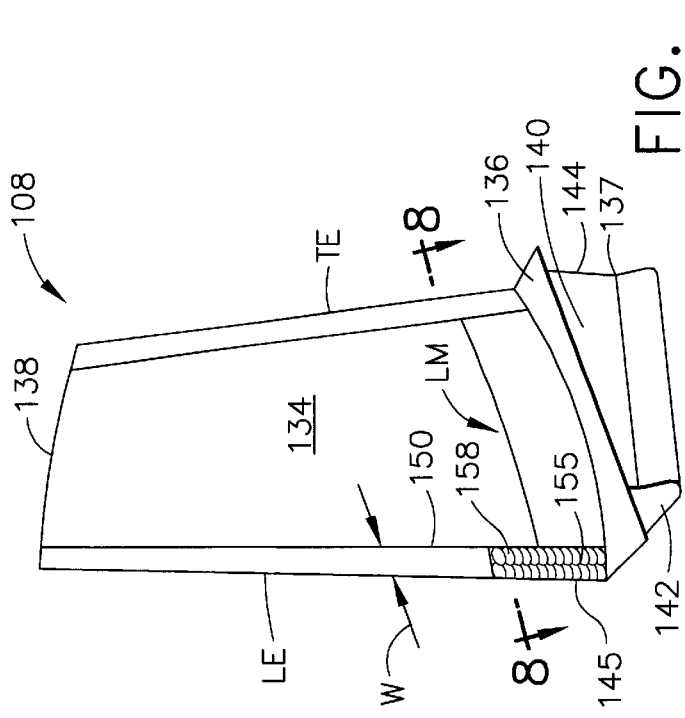
FIG. 7 is a perspective view of the fan blade in FIG. 1.
Figure 8:
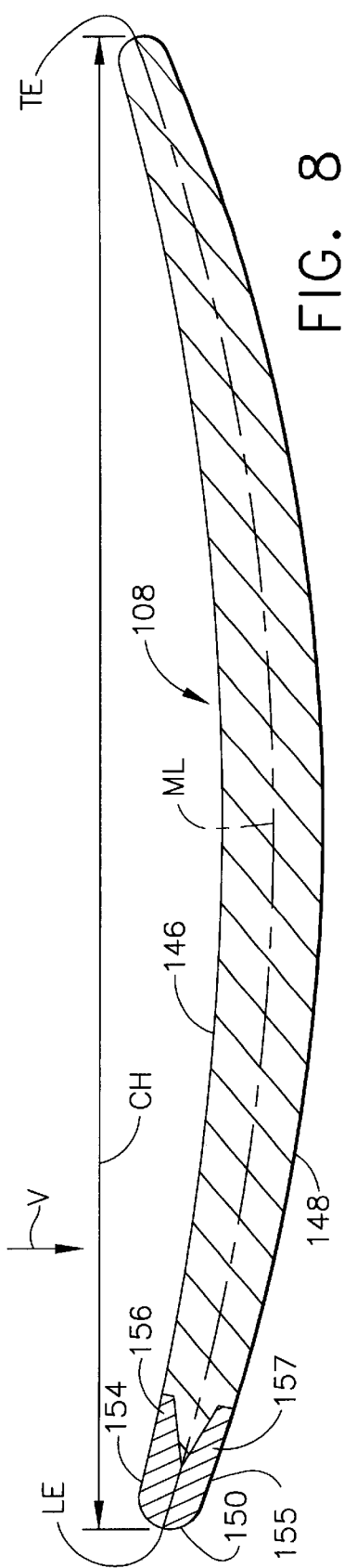
FIG. 8 is a cross-sectional view of the fan blade taken through line 8—8 in FIG. 7.

Further referring to FIGS. 3, 7, and 8, convex suction and concave pressure sides 148 and 146, respectively, of the airfoil 134 have first and second laser shock peening surfaces 154 and 155, respectively, within the patch 145 on opposite sides of the blade 108. The first and second laser shock peening surfaces 154 and 155, respectively, are covered with an ablative coating such as paint or adhesive tape to form a coated surface as disclosed in U.S. Pat. Nos. 5,674,329 and 5,674,328. The paint and tape provide an ablative medium over which is placed a clear containment media which is typically a clear fluid curtain such as a flow of water 121 in FIG. 1.

The blade 108 is continuously moved during the laser shock peening process, while, the laser shock peening system 10 is used to continuously firing stationary high power laser beams 102 through the curtain of flowing water 121 on the coated first and second laser shock peening surfaces 154 and 155 forming spaced apart laser shock peening spots 158. As further illustrated in FIG. 2, the curtain of water 121 is supplied by a water nozzle 123 at the end of a water line 119 connected to a water supply pipe 120. As further illustrated in FIG. 5, the present invention provides a method for setting and monitoring a thickness T (typically about 0.02 inches) of the curtain of flowing water 121 using a ultra-sonic transducer 20 which is monitored during the setup procedure by an oscilloscope or a computer 17 which is used to calculate thickness measurements from the transducer and to display results on a computer display or monitor 19 during setup. The present method also measures water flow rate of the curtain of flowing water 121 using a metering device 22 connected to and monitored by the computer 17 and/or a controller 24 that is also used to monitor and/or control the laser shock peening system 10. A flow valve 26 in the water supply pipe 120 is used to control the flow rate of water through the nozzle 123.

Optionally, the controller 24 is used to control the flow valve 26 as illustrated in FIG. 1 and adjust the flow rate of water through the valve and the nozzle 123.

Figure 10:
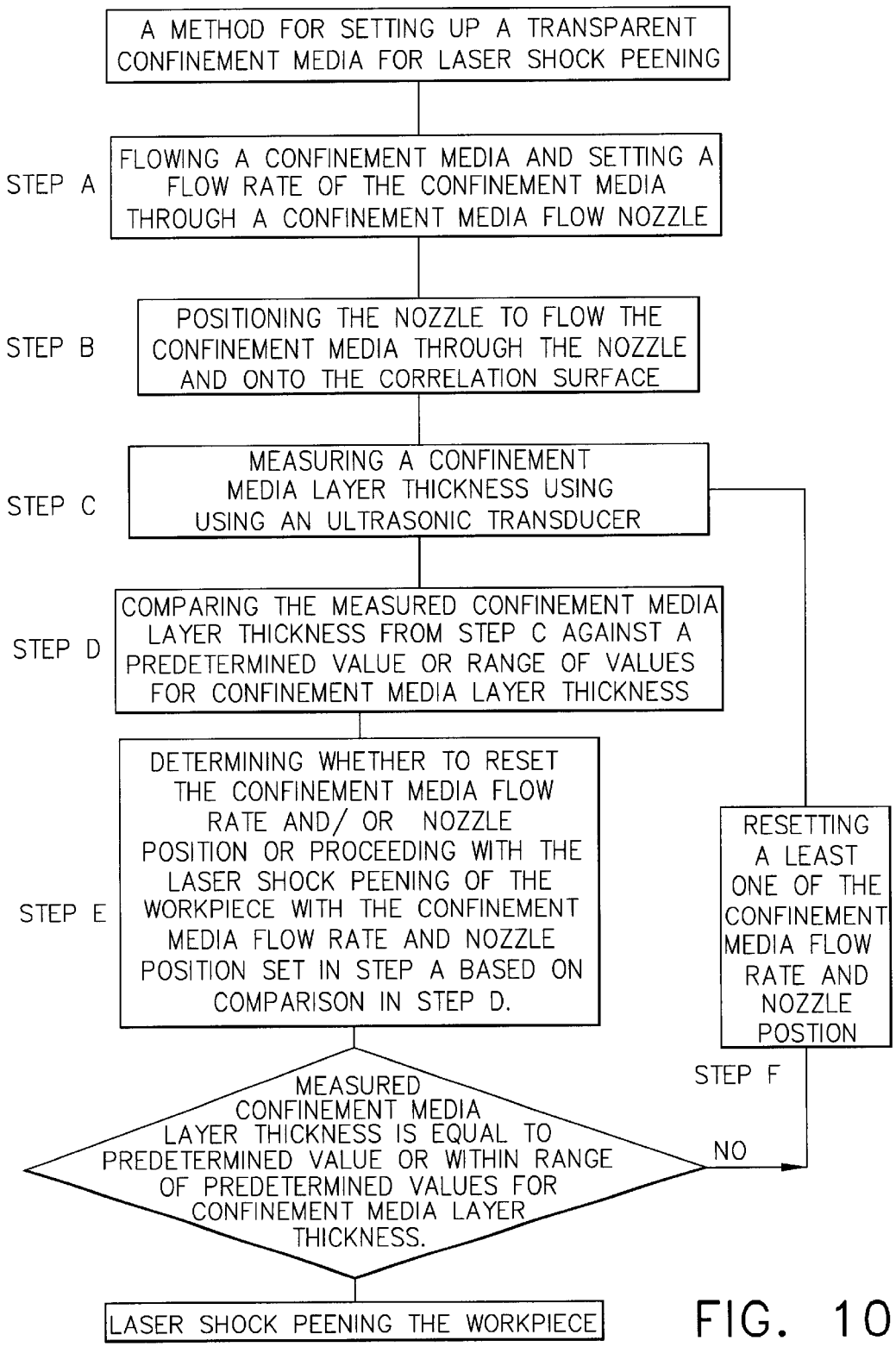
FIG. 10 is a flow chart outlining Steps A through F of an exemplary embodiment of the method of present invention.

The method for setting up the transparent confinement media nozzle 123 for flowing the confinement media illustrated as the curtain of flowing water 121 during laser shock peening of the work piece or blade 108 includes Steps A) through F), as illustrated in the flow chart in FIG. 10. The method is performed for at least one point, further illustrated in FIG. 3 as a center point A of one of the laser shock peening spots 158, on a correlation surface of a test piece related to one patch of work piece to be laser shock peened. Though test pieces can be objects other than an actual work piece, such as a flat or shaped coupon, it is preferred to use the actual work pieces for better accuracy and more consistent results and the correlation surface is the one of the first and second laser shock peening surfaces 154 and 155.

Figure 2:
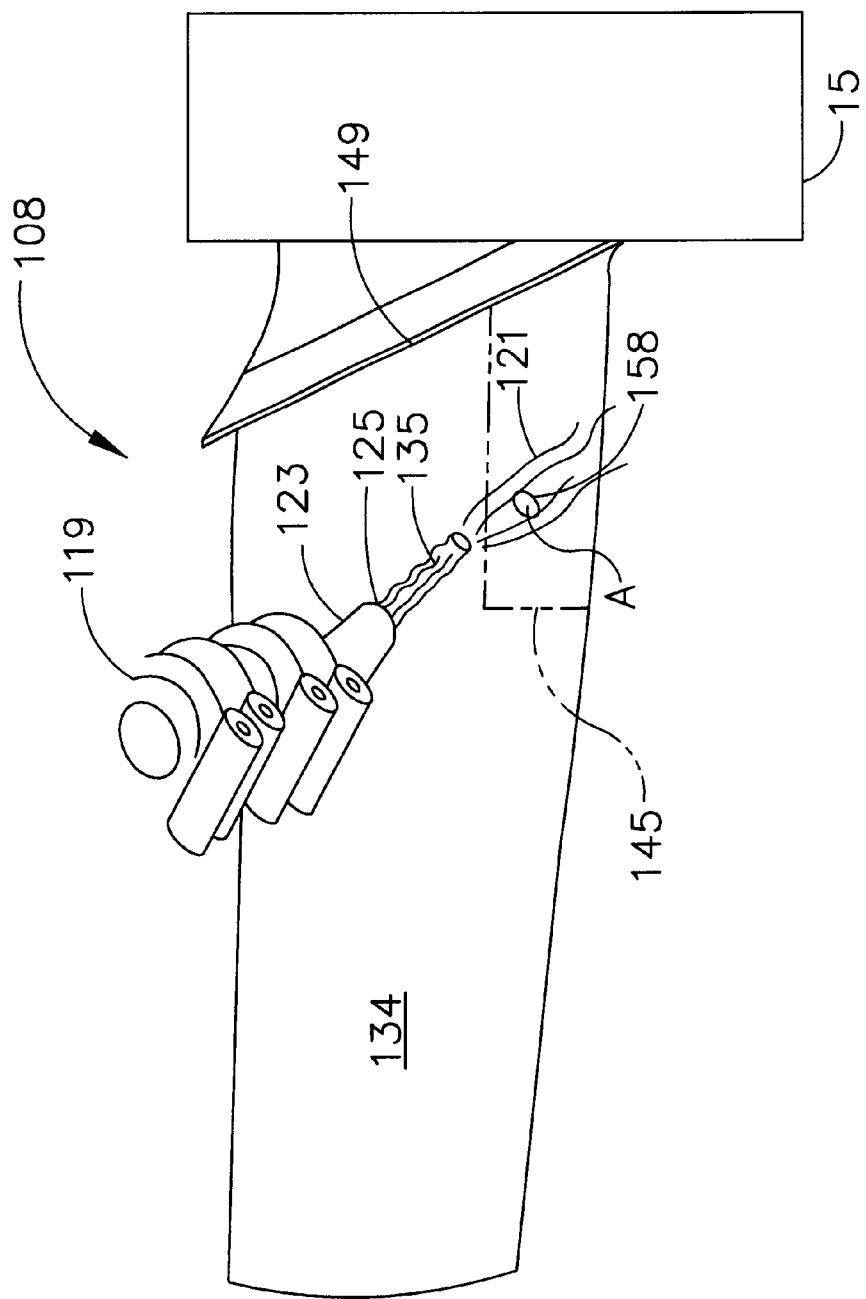
FIG. 2 is perspective illustration of a water nozzle adjusted to flow water onto a patch of the blade in FIG. 1 to be laser shock peened.

Step A includes starting and setting confinement media flow rate through the confinement media nozzle 123. The flow rate is measured using the metering device 22 connected to and monitored by the computer 17 and/or the controller 24. Further referring to FIGS. 2, 3, and 4, Step B includes positioning the nozzle 123 to flow the confinement media (water) downward and toward the airfoil 134 in a stream 135 to hit a water spot 129 on one of the first and second laser shock peening surfaces 154 and 155. Where the stream 135 hits the laser shock peening surface forming the water spot 129 and at what angle relative to the laser shock peening spot 158 are important parameters for forming a uniform curtain of flowing water 121 with a proper thickness T. FIG. 2 is a perspective view of the convex suction side 148 illustrating the position and attitude of the nozzle 123. The nozzle position includes the location of a nozzle outlet 125 of the nozzle 123 and the attitude or angular orientation of the nozzle with respect to the center point A and the laser shock peened surfaces 154 and 155. The water nozzle 123 and the water line 119 are adjustable and may be manually adjusted or automatically adjusted using a second optional manipulator 18 which can be controlled with the controller 24 as illustrated in FIG. 5.

Figure 4:
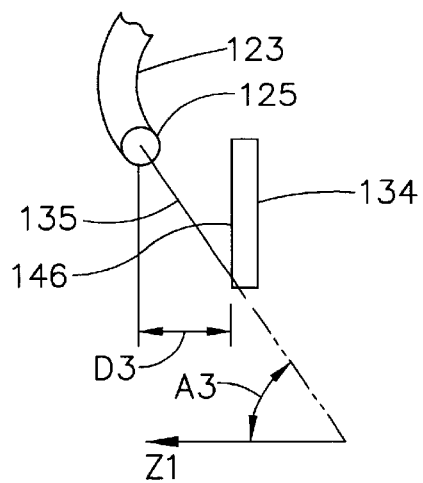
FIG. 4 is a top view layout illustrating the nozzle adjusted to flow water onto a patch on the concave side of the blade in FIG. 3.

The position and attitude of the nozzle 123 is illustrated for the concave pressure side 146 of the airfoil 134 in FIGS. 3 and 4. The location is measured in first, second, and third distances D1, D2, and D3, respectively, in directions along orthogonal first, second, and third axes X1, Y1, and Z1, respectively, and where the first axis X1 is measured from a base 149 of the airfoil 134 and is parallel to the leading edge LE and the second axis Y1 is in a plane of the base and the leading edge. An origin 50 lies at an intersection of the base and the leading edge LE. The attitude of the nozzle 123 is illustrated by the angular orientation of the stream 135 and first, second, and third angles A1, A2, and A3, respectively, between the stream 135 and the first, second, and third axes X1, Y1, and Z1, respectively. The first, second, and third distances D1, D2, and D3 and the first, second, and third angles A1, A2, and A3 are determined by experiment or empirical or semi-empirical methods.

A good water spot distance WD1 between the water spot 129 and each of the associated laser shock peened circular spots 158 can be determined by experiment in order to provide a uniform water flow as well as proper thickness T of the curtain of flowing water 121 over each of the associated laser shock peening spots.

Figure 5:
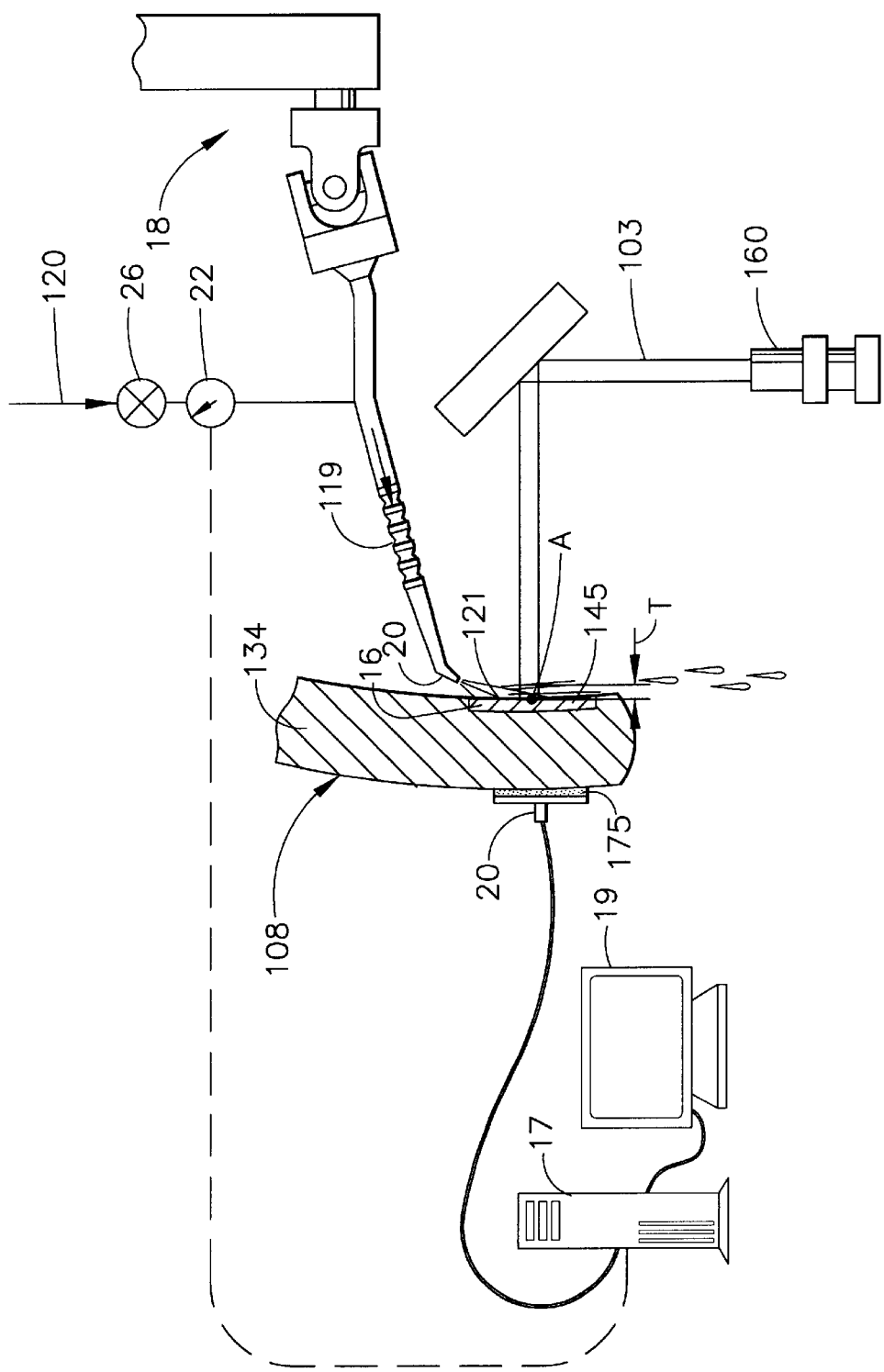
FIG. 5 is a schematic illustration of an exemplary embodiment of a system for measuring thickness of the curtain of water flowed by nozzle in FIGS. 1–4.

As illustrated in FIG. 5, the nozzle position and attitude can be adjusted manually and remain the same during the laser shock peening run for each blade 108. A manually adjustable water line 119 such as ¼ inch Loc-Line brand of modular hose is used to direct and position the water stream 135. The nozzle position and attitude is adjusted and the uniformity of water flow of the curtain of flowing water 121 is checked by using a laser pointer 160 to shine a He—Ne beam 103 off of a mirror 107 along the same path as laser beams 102 in FIG. 1.

Step C is performed after a good uniform curtain of flowing water 121 is established. Step C includes measuring and recording confinement media layer thickness T on the correlation surface, illustrated as the first laser shock peening surface 154, using the ultrasonic transducer 20. The ultrasonic transducer 20 is attached to a side of the test piece opposite that of the correlation surface. In the illustrated embodiment of the invention, the work piece is the test piece and the correlation surface is a first laser shock peening surface 154 on the first or concave pressure side 146 and the ultrasonic transducer 20 is attached to the convex suction side 148 of the airfoil 134 of the blade 108. A layer of epoxy acoustic coupling material 175 is used to acoustically couple and mechanically fasten the ultrasonic transducer 20 to the convex suction side 148 of the airfoil 134. One type of epoxy material that has been used is a 5 minute epoxy made by Devcon. The ultrasonic transducer is later removed and the dried epoxy is chipped off. The use of such a material provides a continuous acoustic medium to allow a flat contact surface of the transducer to transmit and receive ultrasonic waves between the airfoil and the transducer even though there is not a direct contact between the two.

Another embodiment of the invention includes a Step D, comparing the measured confinement media layer thickness T from the Step C against a predetermined value or range of values for confinement media layer thickness. This is followed by a Step E, determining whether to reset the confinement media flow rate and/or the nozzle position or proceeding with the laser shock peening of the work piece with the confinement media flow rate and nozzle position set in the Step A based on the comparison in the Step D. If called for, Step F is performed which calls for resetting the confinement media flow rate and/or the nozzle position and repeating Steps C, D, and E.

Figure 6:
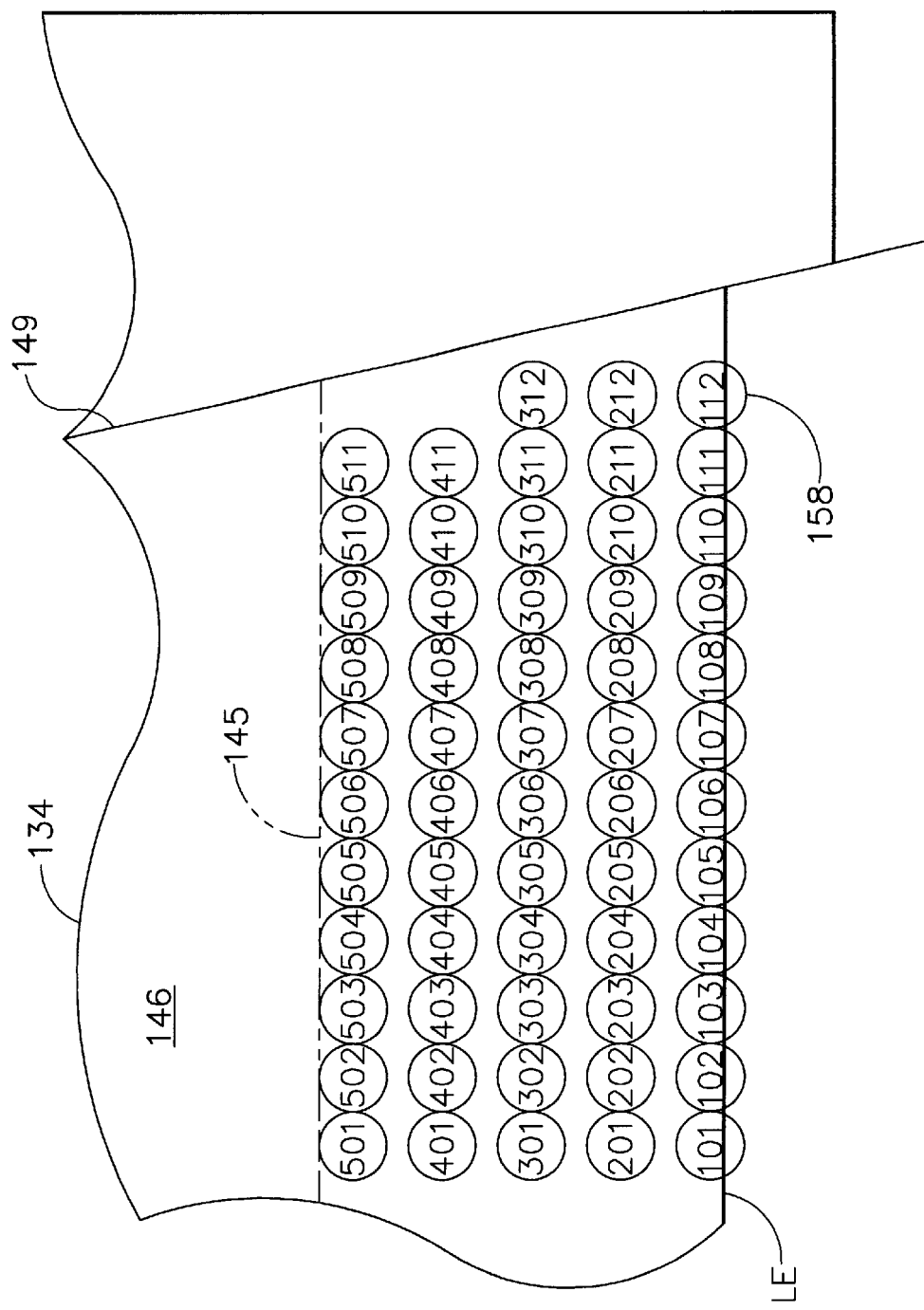
FIG. 6 is a schematic layout of the patch and laser shock peening spots locations on the patch in FIG. 3.

One embodiment of the invention calls for performing Steps B and C for a plurality of points (two or more) such as the center points A of some or all of the laser shock peening spots 158 on the patch 145 of the work piece or blade 108 to be laser shock peened. FIG. 6 illustrates five rows of the overlapping laser shock peening spots 158 numbered 101–112, 210–212, 301–312, 401–411, and 501–511. Odd and even numbered ones of the laser shock peening spots 158 are laser shock peened on different passes and the patch 145 may be recoated between the passes. Not shown are overlapping rows of the shock peening spots 158 between the four rows of the overlapping laser shock peening spots 158 numbered 101–112, 210–212, 301–312, 401–411, and 501–511. Adjacent rows of the overlapping laser shock peening spots 158 and adjacent ones of the overlapping laser shock peening spots typically having an overlap of about 30% and the laser shock peening spots are typically about 0.25 inches.

Step D entails comparing the measured and recorded confinement media layer thickness T for each of the points from Step C against the predetermined value or range of values for confinement media layer thickness. Step E is the performed to determine whether or not to reset the confinement media flow rate and/or the nozzle position or proceed with the laser shock peening of the work piece with the confinement media flow rate and nozzle position as set in Step A based on the comparison in Step D. Then, if called for, a Step F is performed, resetting the confinement media flow rate and/or the nozzle position and repeating Steps C, D, and E.

For simultaneous dual sided laser shock peening, the Steps A through E are done for the first and second laser shock peening surfaces 154 and 155. The exemplary embodiment illustrates performing the method on a gas turbine engine blade component having an airfoil such as a turbine, compressor, or fan blade with leading edge and a trailing edge. Other types of work pieces may also use the method of the present invention and include but are not limited to airfoils of vanes.

In yet another embodiment of the invention, the method is used to calculate a schedule of nozzle attitude and nozzle position settings for each of the points to provide a predetermined confinement media thickness over each of the points and then laser shock peening the work piece by firing a laser beam pulse from a laser shock peening apparatus on each of the points while flowing the confinement media over the points. The nozzle attitude and the nozzle position are set according to the schedule for each of the points during the laser shock peening prior to each firing for which the schedule calls for a change in the nozzle attitude and/or the nozzle position.

Referring to FIGS. 7 and 8, the blade 108 includes an airfoil 134 extending radially outward from a blade platform 136 to a blade tip 138. The blade 108 includes a root section 140 extending radially inward from the platform 136 to a radially inner end 137 of the root section 140. At the radially inner end 137 of the root section 140 is a blade root 142 which is connected to the platform 136 by a blade shank 144. The airfoil 134 extends in the chordwise direction between a leading edge LE and a trailing edge TE of the airfoil. A chord CH of the airfoil 134 is the line between the leading edge LE and trailing edge TE at each cross-section of the blade as illustrated in FIG. 8. A pressure side 146 of the airfoil 134 faces in the general direction of rotation as indicated by an arrow V and a suction side 148 is on the other side of the airfoil. A mean-line ML is generally disposed midway between the two sides in the chordwise direction.

The leading edge section 150 of the blade 108 extends along the leading edge LE of the airfoil 134 from the blade platform 136 to the blade tip 138. The leading edge section 150 includes a predetermined first width W such that the leading edge section 150 encompasses an area where nicks and tears that may occur along the leading edge of the airfoil 134 during engine operation. The airfoil 134 subject to a significant tensile stress field due to centrifugal forces generated by the blade 108 rotating during engine operation. The airfoil 134 is also subject to vibrations generated during engine operation and the nicks and tears operate as high cycle fatigue stress risers producing additional stress concentrations around them.

To counter fatigue failure of portions of the blade along possible crack lines that can develop and emanate from the nicks and tears the laser shock peened patch 145 is placed along a portion of the leading edge LE where incipient nicks and tears may cause a failure of the blade due to high cycle fatigue. The laser shock peened patch 145 is placed along a portion of the leading edge LE where an exemplary predetermined first mode line L of failure may start for a fan or compressor blade. Within the laser shock peened patch 145, at least one and preferably both the pressure side 146 and the suction side 148 are simultaneously laser shock peened to form first and second oppositely disposed laser shock peened blade surfaces 154 and 155 and a pre-stressed blade regions 156 and 157, respectively, having deep compressive residual stresses imparted by laser shock peening (LSP) extending into the airfoil 134 from the laser shock peened surfaces as seen in FIG. 8. The pre-stressed blade regions 156 and 157 are illustrated along only a portion of the leading edge section 150 but may extend along the entire leading edge LE or longer portion thereof if do desired.

Referring back to FIG. 1, the laser shock peening system 10 is illustrated as having a conventional generator 131 with an oscillator, a pre-amplifier, and a beam splitter which feeds the pre-amplified laser beam into two beam optical transmission circuits each having first and second amplifiers. Optics 35 include optical elements including mirrors and lenses that transmit and focus the laser beam 102 on the first and second laser shock peening surfaces 154 and 155 (see U.S. Pat. No. 5,756,965 and other Laser Shock Peening patents listed above for more details). The controller 24 is also used to modulate and control the laser shock peening system 10 to fire the laser beams 102 on the coated first and second laser shock peening surfaces 154 and 155 in a controlled manner and in one embodiment of the invention, to control the positioning and attitude of the nozzle 123. Ablated coating material is washed out by the curtain of flowing water 121.

Figure 9:
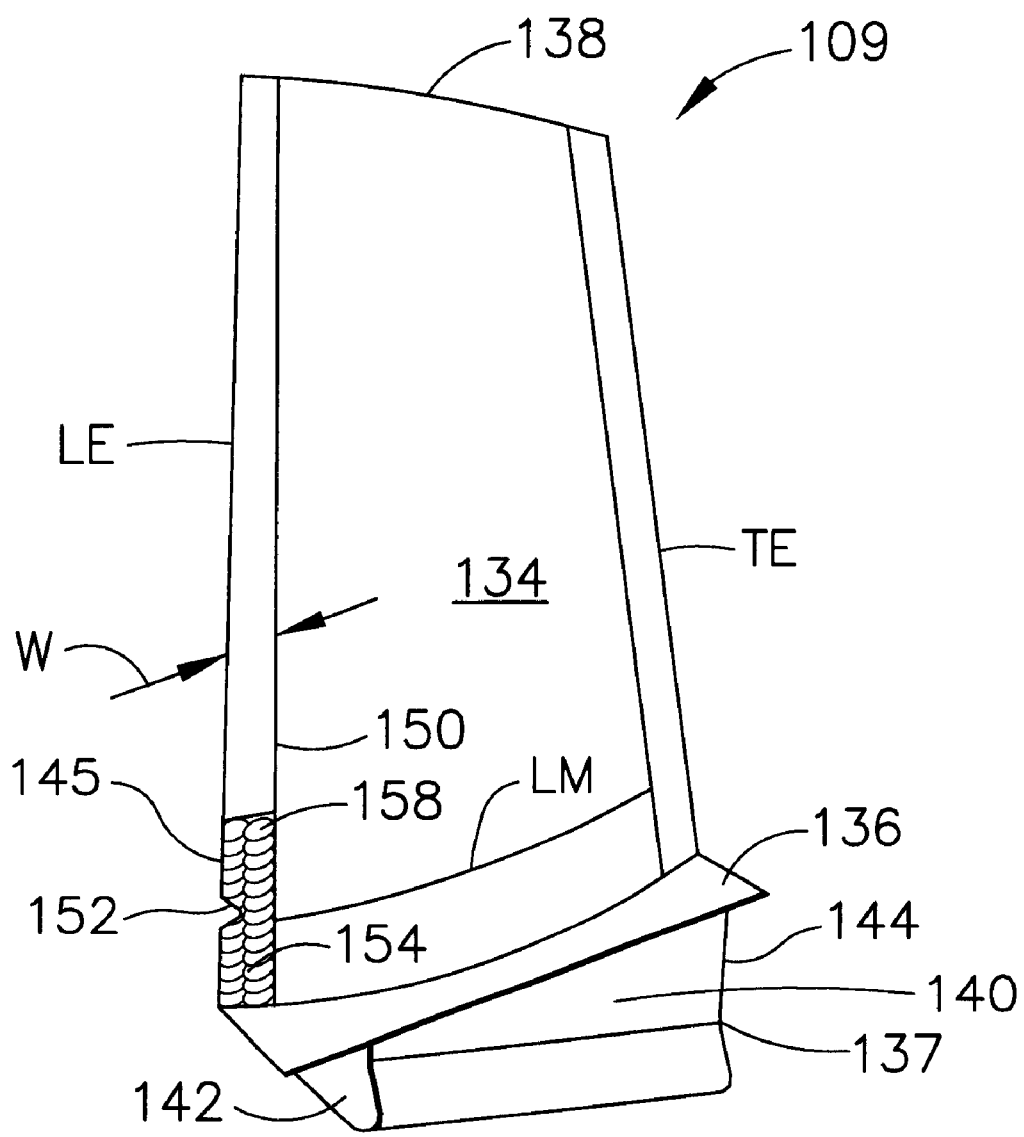
FIG. 9 is a perspective view of a notched fan blade used in the exemplary method of the present invention.

The predetermined value or range of values for confinement media layer thickness can be determined in many ways. One process is high cycle fatigue testing of a test version of the work piece or blade. Illustrated in FIG. 9 is a notched test blade 109 which is identical to the actual production blade 108 with a notch 152 added after the test blade 109 is laser shock peened to form the patch 145. During the laser shock peening of the test blade 109 the thickness T is measured and recorded for each test using the metering device 22 and the parameters regarding the location, attitude, and position of the nozzle 123 to and the water spot 129. These parameters are varied during different tests to achieve different thicknesses T. The test blade 109 is then subjected to HCF testing till it fails for each test. From these tests a correlation of HCF performance versus the thickness T of the curtain of flowing water 121 is developed and the predetermined value or the range of values for the confinement media layer thickness is developed to be used in the methods having Steps A through D, and E and F.

The HCF testing vibrates the notched test blade at a frequency which produces failure along the predetermined first mode line L of the blade. The correlation tests are preferably based on the amount of force exerted on the blade to excite it and cause high cycle fatigue. This can also be correlated to the flow rate of the curtain of flowing water 121 using the metering device 22 connected to and monitored by the computer 17 during the setup for laser shock peening of the test blades 109. The correlation of the flow rate to HCF data can then be used during laser shock peening of work pieces to monitor and/or control the laser shock peening system 10 in order to provide the proper confinement media layer thickness and/or to alert operators that the flow rate is unacceptable. The metering device 22 can include an alarm or be connected to the controller which can sound an alarm or issue a warning message when the monitored confinement media layer thickness flow rate is unacceptable.

While the preferred embodiment of the present invention has been described fully in order to explain its principles, it is understood that various modifications or alterations may be made to the preferred embodiment without departing from the scope of the invention as set forth in the appended claims.

What is claimed is:

1. A method for setting up a transparent confinement media nozzle for flowing a confinement media during laser shock peening of a work piece, said method comprising the following steps for at least one point on a correlation surface of a test piece related to one patch of the work piece to be laser shock peened:
   A) flowing the confinement media and setting a flow rate of the confinement media through the confinement media flow nozzle,
   B) positioning the nozzle to flow the confinement media through the nozzle and onto the correlation surface, and
   C) measuring a confinement media layer thickness on the correlation surface using an ultrasonic transducer attached to a side of the test piece opposite that of the correlation surface.

2. A method as claimed in claim 1 wherein said test piece is the work piece and said correlation surface is a first laser shock peening surface on a first side of the work piece.

3. A method as claimed in claim 2 further comprising:
   D) comparing the measured confinement media layer thickness from Step C) against a predetermined value or range of values for confinement media layer thickness, and
   E) determining whether to reset at least one of the confinement media flow rate and nozzle position or proceeding with the laser shock peening of said work piece with the confinement media flow rate and nozzle position set in Step A) based on said comparison in Step D).

4. A method as claimed in claim 3 further comprising Step F) resetting at least one of the confinement media flow rate and nozzle position and repeating Steps C), D), and E).

5. A method as claimed in claim 2 further comprising performing Steps B) and C) for a center point of a spot to be laser shock on the patch of the work piece.

6. A method as claimed in claim 2 further comprising performing Steps B) and C) for a plurality of center points of a corresponding plurality of spots to be laser shock on the patch of the work piece.

7. A method as claimed in claim 6 further comprising:
   D) comparing the measured and recorded confinement media layer thickness for each of the points from Step C) against a predetermined value or range of values for confinement media layer thickness, and
   E) determining whether to reset at least one of the confinement media flow rate and nozzle position or proceeding with the laser shock peening of said work piece with the confinement media flow rate and nozzle position set in Step A) based on said comparison in Step D).

8. A method as claimed in claim 7 further comprising Step F) resetting at least one of the confinement media flow rate and nozzle position and repeating Steps C), D), and E).

9. A method as claimed in claim 7 wherein said method is performed in a laser shock peening system having at least one fixed laser beam source for laser shock peening and a controllable first manipulator holding the work piece and between Steps A) and B) at least one of a work piece attitude and work piece position is adjusted by the first manipulator to match the work piece attitude and the work piece position during laser shock peening of the work piece.

10. A method as claimed in claim 9 further comprising Step F) resetting at least one of the confinement media flow rate and nozzle position and repeating Steps C), D), and E).

11. A method as claimed in claim 9 wherein said setting and resetting of the nozzle position is done using a controllable second manipulator holding the nozzle.

12. A method as claimed in claim 7 wherein said Steps A) through E) comprise a first set of steps and said method further comprises performing a second set of Steps A) through E) on a second laser shock peening surface of the work piece on a second side of the work piece opposite the first laser shock peening surface of the first side after Steps A) through E) are performed on the first laser shock peening surface.

13. A method as claimed in claim 12 wherein said first and second set of steps further comprise a Step F) resetting at least one of the confinement media flow rate and nozzle position and repeating Steps C), D), and E) in said first and second set of steps.

14. A method as claimed in claim 13 wherein said method is performed in a laser shock peening system having at least one fixed laser beam source for laser shock peening and a controllable first manipulator holding the work piece and between Steps A) and B) at least one of a work piece attitude and work piece position is adjusted by the first manipulator to match the work piece attitude and the work piece position during laser shock peening of the work piece.

15. A method as claimed in claim 14 wherein said setting and resetting of the nozzle position is done using a controllable second manipulator holding the nozzle.

16. A method for controlling the thickness of a flowing confinement media during a laser shock peening process of production work pieces, said method comprising the following steps:
   performing a setup procedure for setting up a transparent confinement media nozzle for flowing the confinement media during the laser shock peening of a work piece, said setup procedure comprising the following steps for at least one point on a first laser shock peening surface of the work piece:
   A) flowing the a confinement media and setting a flow rate of the confinement media through the confinement media flow nozzle,
   B) positioning the nozzle to flow the confinement media through the nozzle and onto the first laser shock peening surface, and
   C) measuring a confinement media layer thickness on the first laser shock peening surface using an ultrasonic transducer attached to a second side of the work piece opposite that of the first side;
   laser shock peening a first plurality of work pieces; and
   performing a checking procedure for checking the thickness of the confinement media, said checking procedure comprising repeating Steps B) and C),
   D) comparing the measured confinement media layer thickness from Step C) against a predetermined value or range of values for confinement media layer thickness, and
   E) determining whether to reset at least one of the confinement media flow rate and nozzle position or proceeding with the laser shock peening of said work piece with the confinement media flow rate and nozzle position set in Step A) based on said comparison in Step D).

17. A method as claimed in claim 16 further comprising Step F) resetting at least one of the confinement media flow rate and nozzle position and repeating Steps C), D), and E).

18. A method as claimed in claim 17 further comprising performing Steps B) and C) for each of a plurality of center points of a corresponding plurality of spots to be laser shock on the first laser shock peening surface of the work piece.

19. A method as claimed in claim 18 wherein said laser shock peening includes changing at least one of the position and the attitude of the work piece for each of the center points.

20. A method as claimed in claim 19 wherein said Steps A) through E) comprise a first set of steps and said method further comprises performing a second set of Steps A) through E) on a second laser shock peening surface of the work piece on a second side of the work piece opposite the first laser shock peening surface of the first side after Steps A) through E) are performed on the first laser shock peening surface.

21. A method as claimed in claim 19 wherein said work piece is a gas turbine engine component having an airfoil with leading edge and a trailing edge and said sides are convex suction and concave pressure sides of the airfoil and the patch is located along one of the edges.

22. A method as claimed in claim 19 further comprising placing an epoxy acoustic coupling material between the ultrasonic transducer the airfoil.

23. A method as claimed in claim 16 further comprising placing an epoxy acoustic coupling material between the ultrasonic transducer the airfoil.

24. A method for controlling the thickness of a flowing confinement media during a laser shock peening method of production work pieces, said process comprising the following steps:

performing a setup procedure for setting up a transparent confinement media nozzle for flowing the confinement media on a first laser shock peening surface on a first side of a work piece during the laser shock peening of the work piece, said setup procedure comprising the following steps performed for a plurality of center points of a corresponding plurality of spots to be laser shock peened on the first laser shock peening surface:

A) flowing a confinement media and setting a flow rate of the confinement media through a confinement media flow nozzle, B) positioning the nozzle to flow the confinement media through the nozzle and onto the first laser shock peening surface for each of the points using a first controllable manipulator holding the work piece to set work piece attitude and work piece position and a second controllable manipulator holding the nozzle to set nozzle attitude and nozzle position, and C) adjusting the nozzle attitude and the nozzle position with the second manipulator while measuring a plurality of confinement media layer thicknesses corresponding to each of the points to be laser shock peened using an ultrasonic transducer attached to a second side of the work piece opposite that of the first side.

25. A method as claimed in claim 24 further comprising calculating a schedule of nozzle attitude and nozzle position settings for each of the points to provide a measured confinement media thickness equal to a predetermined confinement media thickness over each of the points and laser shock peening the work piece by firing a laser beam pulse from a laser shock peening apparatus on each of the points while flowing the confinement media over the points wherein the nozzle attitude and the nozzle position are set according to said schedule for each of the points.

26. A method as claimed in claim 24 further comprising calculating a schedule of nozzle attitude and nozzle position settings for each of the points to provide a confinement media thickness in a range of predetermined confinement media thicknesses over each of the points and laser shock peening the work piece by firing a laser beam pulse from a laser shock peening apparatus on each of the points while flowing the confinement media over the points wherein the nozzle attitude and the nozzle position are set according to said schedule for each of the points.

\* \* \* \* \*